Figure 1:
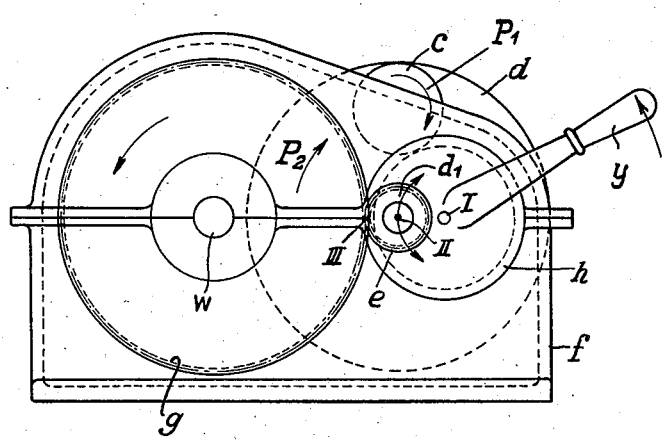

July 30, 1940.  A. F. FLENDER  2,209,878

FRICTION GEARING

Filed June 7, 1938  2 Sheets-Sheet 1

July 30, 1940.　　A. F. FLENDER　　2,209,878
FRICTION GEARING
Filed June 7, 1938　　2 Sheets-Sheet 2

Inventor:
Alfred G. Flender
By Watson, Cole, Grindle & Watson
Attorneys.

Patented July 30, 1940

2,209,878

UNITED STATES PATENT OFFICE 2,209,878

FRICTION GEARING

Alfred Friedrich Flender, Bocholt in Westphalia, Germany, assignor to the firm A. Friedr. Flender & Co., Bocholt, Germany Application June 7, 1938, Serial No. 212,382
In Germany June 3, 1937

6 Claims. (Cl. 74—208)

This invention relates to improved friction gearing. In known friction wheel gearing driving toothed wheel gearing, a common mounting of the driven friction wheel and driving toothed wheel is freely swingable about the axis of the driven toothed wheel. By this means, the engagement pressure between the two friction wheels is produced by the reaction between the two toothed wheels during torque transmission. The value of such engagement pressure depends upon the length of the swing arm which is equal to the distance between the axes of the two toothed wheels. In order to keep this arm as short as possible, it has been necessary to construct toothed wheels of the required dimensions of high-value materials.

The product of the value of the engagement pressure and the coefficient of friction determines the value of the power to be transmitted by the friction wheels. Consequently, the principal object of the invention is to increase the engagement pressure produced by the reaction between the toothed gears. The achievement of this enables the transmission of greater power with the same dimensions and the same coefficient of friction. Or, it enables a more favourable, or lower, coefficient of friction to be used for transmission of the same amount of power.

According to this invention, the axis of swing of the driven friction wheel and driving toothed wheel is located on the far side of the point of mesh between the toothed gears, that is to say on the far side from the axis of rotation of the driven toothed wheel. Thus, if the axis of swing of the driving toothed wheel be indicated by I, the axis of rotation of that wheel by II and the point of mesh between the toothed wheels by III, it is possible to adopt any desired lever ratio between I–II and I–III.

Depending upon the lever arm values thus selected, the reaction pressure between the toothed wheels, acting oppositely to the direction of rotation, is converted into an increased engagement pressure between the two friction wheels. In this improved gearing, the amount of movement of deflection is limited solely by the deformation produced by the engagement pressure at the point of contact between the friction wheels. By employing appropriate superficially hard materials, this deformation can be kept within such limits that alteration of distance between the axes of the two toothed wheels, caused by the swinging movement, remains within the usual limits of precision for tooth meshing.

To permit of stepless variation of speed ratio between the friction wheels, one or both friction wheels may be conical and the driving wheel may be smaller than the driven wheel and disposed inside the latter. Displacement of one friction wheel for varying the diameter at the point of contact is then parallel to the generatrix of the conical surface or surfaces. The degree of swinging movement is uninfluenced by this displacement and is not determined by the pitch circle of the conical friction wheel.

For full utilization of the engagement pressure, the friction ring of the driven wheel may be cylindrical. In this case, the angle between the axis of the conical driving wheel and the axis of the driven wheel is equal to one half of the cone angle.

In order to enable this invention to be readily understood, reference is made to the accompanying drawings illustrating examples of gearings in accordance with the invention, in which drawings:

Figure 1 is a side elevation and

Figure 2:
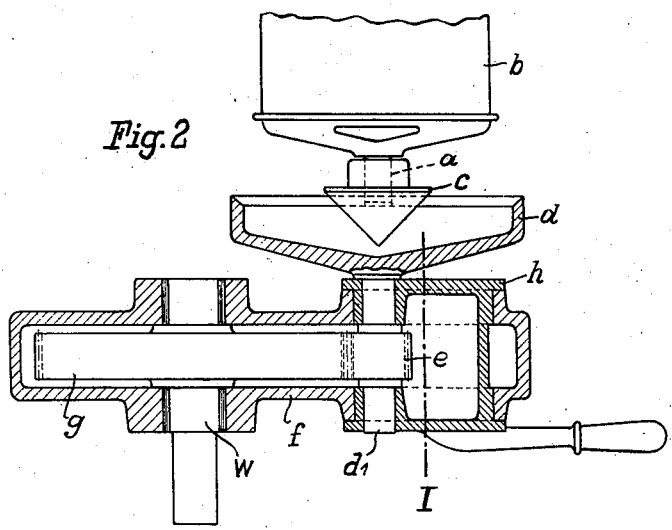

Figure 2 a plan section of an improved combined friction and toothed wheel gearing.

Figure 3:
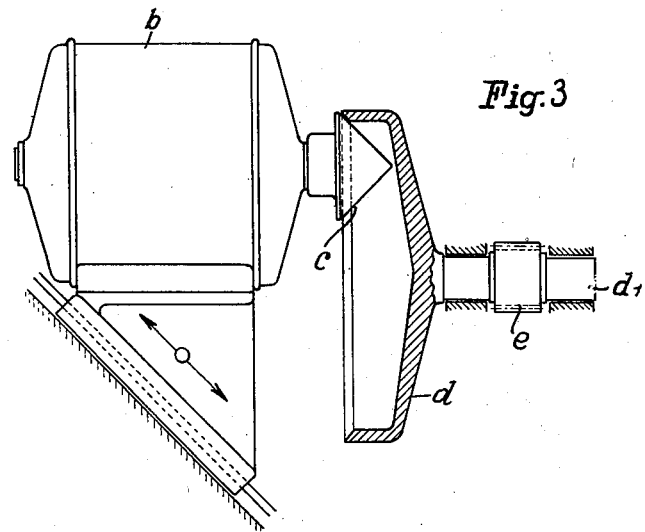
Figure 4:
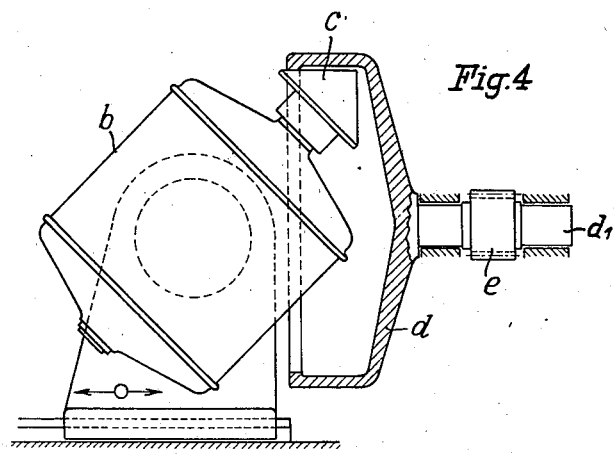

Figures 3 and 4 are sectional elevations of different forms of variable friction gearing that may be employed in the combination.

Referring to Figures 1 and 2, $a$ is the stub shaft of a motor $b$ and has mounted upon it a conical driving friction wheel $c$. A driven friction wheel $d$ of larger diameter and of dished formation, cooperates with the driving wheel $c$. A toothed wheel $e$ is fixedly mounted on the shaft $d_1$ of the driven friction wheel $d$. The wheel $e$ meshes with and drives the larger gear wheel $g$ which is revoluble in the housing $f$.

The common shaft $d_1$ of the driven friction wheel $d$ and the driving toothed wheel $e$ is supported by bearings in a freely swingable mounting $h$ which, in the example illustrated consists of an eccentric device turnable in bearings in a part of the housing $f$. The axis I around which the eccentric $h$ is rotatable, is therefore the swing axis for the wheels $d$ and $e$. This axis I lies on the far side of the point of mesh III of the toothed wheels $e$ and $g$, that is to say on the side remote from the shaft W of the toothed wheel $g$.

The operation is as follows: The motor $b$ and driving cone $c$ revolve in the direction of the arrow P1 in Figure 1. The friction wheel $d$ and toothed gear $e$ are driven in the direction of the arrow P2 by the frictional engagement between $c$ and $d$ and the toothed gear $g$ is driven in the direction of the arrow P3. With a torque in the shaft W for driving a machine for example, a reactional tooth pressure appears at the pitch circle of the wheels $g$ this pressure being opposite to the direction of rotation. This same pressure acts at the small pitch circle radius of the driving toothed wheel $e$ and, due to the freely swingable mounting of the latter, produces a torque of definite value corresponding to the lever arm I–III namely the distance between the point of mesh and the swing axis. This torque tends to swing the wheel $e$, shaft $d1$, and wheel $d$ about the swing axis I. In other words, the effect is to tend to depress the friction wheel $d$ in Figure 1, harder on to the driving friction wheel $c$. Due to the inequality of the lever arm lengths thus brought into action in accordance with the invention, the frictional engagement pressure between the wheels $d$ and $c$ amounts to a multiple of the tooth pressure aforesaid arising from the torque transmission. It can be easily observed from Figure 1, which indicates the swing movement by reversely directed arrows passing through the axis II, that the lever arms coming into action are very favourable for the production of a good transmission pressure between the friction wheels $c$ and $d$.

In order to provide a stepless variable speed gearing, friction gearing such as is illustrated in Figures 3 and 4 may be employed. In Figure 3, the wheel $d$ has a conical friction ring for engagement with the driving cone $c$. In order to be able to vary the ratio, the motor $b$ is supported by an inclined slider movable in parallelism with the generatrix of the conical gear surfaces, as indicated by the opposed arrows. Adjustment of the motor $b$ and cone $c$ up and down the inclined slideway will, therefore, change the transmission ratio as desired. With this arrangement, the running axes of the two wheels $c$ and $d$ are parallel.

In Figure 4, the wheel $d$ has a cylindrical friction ring and in this case the motor $b$ is supported so that the axis of the wheel $c$ encloses an angle with the axis of the wheel $d$ which is one half of the apex angle of the cone constituting the wheel $c$. In this case, the motor is supported by a slider adjustable horizontally as indicated by the opposed arrows in this figure. Such adjustment is, again, parallel with the generatrix of the cone $c$.

As will be apparent from Figures 3 and 4, the amount of automatic swing movement producing engagement pressure between the wheels $c$ and $d$ is unaffected by any slider adjustment for varying the transmission ratio.

As shown in Figures 1 and 2, a handle $y$ may be attached to the swingable mounting, such as the eccentric device $h$, and this handle may be manually operated for varying the engagement pressure of the friction wheels.

I claim:

1. Combined variable ratio friction and toothed gearing comprising a freely rotatable cylindric carrier, a shaft eccentrically mounted in said carrier and supporting a driving toothed gear and driven friction wheel, bearings for said carrier disposed externally of the driven toothed gear, and a slidable support for the driving friction cone said support being slidably adjustable in parallelism with the generatrix of said cone without affecting the degree of swing of the cylindric carrier.

2. In a mixed friction and toothed gearing and in combination, a driving friction cone, a dished friction wheel entered by and engaging with said cone, a driving toothed gear, a common shaft for said dished wheel and said driving toothed gear, a cylindric carrier having said shaft eccentrically supported therein, bearings giving free rotational support for said carrier, and a driven toothed gear in mesh with said driving toothed gear and having an axis of rotation remote from said bearings.

3. Combined friction and toothed gearing in which tooth reaction of the toothed gears produces pressure engagement of the friction gears, the said gearing comprising a swingable mounting for a driven friction gear and a driving toothed gear, said mounting being a freely revoluble bushing in which the common axis of said driven friction gear and said driving toothed gear is eccentrically disposed, said mounting having its swing axis removed from the center of the driven toothed gear.

4. Combined friction and toothed gearing in which tooth reaction of the toothed gears produces pressure engagement of the friction gears, the said gearing comprising a swingable mounting for a driven friction gear and a driving toothed gear, said mounting being a freely revoluble bushing in which the common axis of said friction gear and said driving toothed gear is eccentrically disposed, said mounting having its swing axis on that side of the point of mesh of the toothed gearing remote from the center of the driven toothed gear.

5. Combined friction and toothed gearing comprising a freely rotatable carrier for a driving toothed gear and driven friction gear supported eccentrically of said carrier, a driven toothed gear engaging said driving toothed gear, said rotatable carrier having its axis of rotation removed from the axis of rotation of said driven toothed gear, whereby tooth reaction of the toothed gearing rotatably operates said carrier for producing pressure engagement of the friction gears.

6. Combined friction and toothed gearing comprising a freely rotatable cylindric carrier, a shaft eccentrically mounted in said carrier and supporting a driving toothed gear and a driven friction gear, and bearings for said carrier disposed externally of the driving toothed gear, a driven toothed gear in mesh with said driving toothed gear at a point intermediate the axis of rotation of said cylindric carrier and the axis of rotation of said driven toothed gear, whereby tooth reaction of the toothed gearing rotatably operates said carrier for producing pressure engagement of the friction gears.

ALFRED FRIEDRICH FLENDER.